United States Patent [19]
Gurfinkel

[11] Patent Number: 5,868,940
[45] Date of Patent: Feb. 9, 1999

[54] METHOD FOR ON-SITE REMEDIATION OF CONTAMINATED NATURAL RESOURCES AND FABRICATION OF CONSTRUCTION PRODUCTS THEREFROM

[76] Inventor: Alex Gurfinkel, 11 Camelot Ct., Apt. 1A, Brighton, Mass. 02135

[21] Appl. No.: 626,397

[22] Filed: Apr. 2, 1996

Related U.S. Application Data

[63] Continuation-in-part of Ser. No. 112,221, Aug. 27, 1993, abandoned, which is a continuation-in-part of Ser. No. 767,147, Sep. 27, 1991, Pat. No. 5,240,608.

[51] Int. Cl.$^6$ .......................... B01D 35/06; C04B 14/02; F26B 3/347

[52] U.S. Cl. .......................... 210/695; 210/737; 210/747; 210/748; 210/749; 210/766; 210/770; 210/772; 210/774; 210/781; 210/800; 106/723; 106/739; 106/746; 134/4; 134/10; 264/420; 34/259

[58] Field of Search .................................. 106/739, 723, 106/746; 134/4, 10; 210/695, 737, 747, 748, 749, 766, 770, 772, 774, 781, 806, 170, 173, 244; 264/420; 405/128, 129; 34/259

[56] References Cited

U.S. PATENT DOCUMENTS

| | | |
|---|---|---|
| 3,714,037 | 1/1973 | Almasi et al. . |
| 4,242,220 | 12/1980 | Sato ........................................ 210/770 |
| 4,338,135 | 7/1982 | Cook ....................................... 106/723 |
| 4,541,927 | 9/1985 | Breidenbaugh ......................... 210/170 |
| 4,828,393 | 5/1989 | Smalls et al. ............................. 366/2 |
| 5,106,424 | 4/1992 | Rez . |
| 5,168,008 | 12/1992 | Yoshida et al. . |
| 5,230,167 | 7/1993 | Lahoda et al. . |
| 5,240,608 | 8/1993 | Gurfinkel et al. . |

FOREIGN PATENT DOCUMENTS

| | | |
|---|---|---|
| 34850 | 1/1971 | U.S.S.R. . |
| 336274 | 5/1972 | U.S.S.R. . |

*Primary Examiner*—David A. Reifsnyder
*Attorney, Agent, or Firm*—Lappin & Kusmer LLP

[57] ABSTRACT

Methods for on-site remediation of contaminated natural resources and fabrication of construction products therefrom. A mobile treatment facility is provided at the site of the contaminated natural resources. Contaminated sediment, soil, pulp and/or liquids are obtained from the site and processed on-site to obtain a variety of construction materials, including coarse and fine particulate material, bricks, concrete products, pellets and aggregate material. Coarse, sand-like materials are fabricated from decontaminated clay-based based materials and used in the fabrication of concrete products. Waste streams are combined to optimize their mutually neutralizing properties. Contaminants such as inorganics and heavy metals are immobilized as water-insoluble complexes in the matrix of the resulting products. Organic contaminants are volatilized and/or burned off, and thermochemical reactions of inorganic contaminants are induced, in a high-temperature irradiation treatment. Contaminated sediments and soils can be substantially reduced in weight and volume, with or without remediation, so that they can be transported in compact form to disposal and storage sites.

21 Claims, 5 Drawing Sheets

METHOD FOR ON-SITE REMEDIATION OF CONTAMINATED NATURAL RESOURCES AND FABRICATION OF CONSTRUCTION PRODUCTS THEREFROM

REFERENCE TO RELATED APPLICATIONS

This application is a continuation-in-part of application Ser. No. 08/112,221, filed on Aug. 27, 1993, abandoned, which is a continuation-in-part of application Ser. No. 07/767,147, filed on Sep. 27, 1991, now U.S. Pat. No. 5,240,608.

TECHNICAL FIELD

The present invention relates to methods for treating contaminated natural resources so that they can be used as raw materials in the fabrication of construction products. More particularly, the invention relates to methods for the on-site remediation of contaminated natural resources and the concurrent fabrication of construction products from those resources.

BACKGROUND OF THE INVENTION

The Earth's natural resources comprise the basic raw materials for many types of construction materials and products. However, these resources may be contaminated with organic and inorganic contaminants with pollutants from nearby industrial processes and thus may not be suitable for use in their contaminated state for building and construction products. The cleanup of such natural resources can require a substantial outlay of equipment, energy and resources and can thus be prohibitively expensive.

A significant component of the expense of cleaning up natural resources is the cost to transport the contaminated resources (soil, water, etc.) to and from a remediation or treatment facility.

Mobile remediation apparatus for dredging waterways and for fabrication of construction products from the dredged material is disclosed in U.S. Pat. No. 5,240,608 to Gurfinkel et al.

Three primary materials used in the building and construction industries are concrete, brick and fill material. Concrete is typically manufactured from a mixture of approximately 30% coarse material, such as sand, 30–50% aggregate or other coarse particulate matter, 7–15% cement binder, and 14–21% water. Concrete is formed by placing the mixture in forms and allowing the mixture to cure for up to several days.

Brick is typically manufactured from clay or silt (at least 50% by weight), which is comprised of relatively fine particulate matter, no more than about 30% by weight sand, and between 8 and 12% water. Bricks are formed by placing the clay mixture in molds and drying and baking the mixture for up to several days to drive off the moisture and form a hard, brittle product, which is then cooled slowly. The bricks can be optionally glazed and/or colored to seal them and provide decorative or identifying markings.

The term "coarse", as used herein, means any particulate material having a mean particle size of at least 0.063 mm. The term "fine", as used herein, means any particulate material having a mean particle size of less than 0.063 mm. The term "sediment", as used herein, means a material comprising up to about 50% water and at least one of sand, soil, silt, clay and loam. The term "pulp", as used herein, means a material comprising at least 50% water and at least one of sand, soil, silt, clay and loam. The term "contaminant", as used herein, means any type of substance which is present in the environment in amounts which are toxic to health and/or life. The term "industrial waste", as used herein, means any solid, liquid or gaseous byproduct of an industrial process, including, but not limited to, solvents, chemicals, carcinogens, organic and inorganic materials, combustion products, and the like. The term "hazardous waste", as used herein, means any solid, liquid or gaseous waste product of a chemical, biological, or biochemical process, including, but not limited to, radiological, medical, bacteriological, chemical and other infectious waste. The term "heavy metals", as used herein, means any compound or complex of a metal which may be considered toxic if ingested or absorbed into the body in more than miniscule amounts, including, but not limited to, mercury, lead, bismuth, arsenic, cadmium, gold, silver, platinum, nickel, chromium, aluminum, beryllium, and molybdenum. The term "clean", as used herein, means to remove impurities in a liquid or steam washing process. The term "decontaminated", as used herein, means a product in which contaminants have been immobilized as complex compounds or neutralized so that the contaminants are not susceptible to leaching or otherwise escaping from the product into the environment.

OBJECTS OF THE INVENTION

It is an object of the present invention to provide a method for the on-site remediation of contaminated natural resources and the on-site fabrication of construction materials and products from the remediated and/or contaminated resources.

It is another object of the invention to provide a method of on-site remediation of contaminated natural resources, in which multiple diverse waste streams can be selected and combined with the option of minimizing or neutralizing the contaminants in the resulting products and byproducts.

It is another object of the invention to provide a method of remediation of contaminated natural resources, in which at least water and organic contaminants can be removed from a contaminated material at the site of contamination, with the option of further remediation on-site and/or off-site.

It is another object of the invention to provide a method of on-site remediation of contaminated natural resources and fabrication of construction products therefrom, in which heavy metal contaminants are immobilized as water-insoluble complexes in the resulting products.

It is another object of the invention to provide a method for reducing the weight and/or volume of contaminated natural resources on-site for subsequent removal to, and storage at, a disposal site.

It is another object of the invention to provide a method for remediation of postprocessing byproducts, including water and gases containing volatilized and/or incinerated organic contaminants, prior to release into the environment.

SUMMARY OF THE INVENTION

According to one aspect of the invention, there is provided a method for the on-site remediation of contaminated natural resources and the fabrication of construction products therefrom. The method comprises the steps of:

A. providing a mobile facility for remediation and fabrication at the site of the contaminated natural resources;

B. obtaining a contaminated sediment or pulp from the site, the material comprising water and at least one of sand, soil, silt, clay and loam, and further including at least one contaminant selected from the group consisting of heavy metals, industrial waste, hazardous waste, and organic and inorganic contaminants;

C. activating the contaminated material in a magnetic field;

D. separating the activated material into a coarse fraction and a fine fraction;

E. removing a substantial portion of the water from the fine fraction; and

F. combining predetermined amounts of the coarse fraction, the fine fraction and a dry waste material to form a construction/fill material composition.

The percentage of the coarse fraction in the composition can be varied in order to obtain the desired products. For example, for concrete products, the coarse fraction comprises no more than about 30% by weight of the composition. In contrast, for bricks, pellets and lightweight aggregate, the coarse fraction is not limited to 30% of the composition.

In one embodiment, the composition is placed in molds to obtain bricks and pellets and irradiated at microwave frequencies to form water-insoluble compounds in a reaction of the inorganic contaminants in the composition. Byproducts of the irradiation treatment include water vapor and gases containing volatilized and/or incinerated organic contaminants.

The water is removed from the fine fraction by centrifuging, pressing and/or evaporation. The water can additionally be filtered, clarified, and chemically treated according to known processes to remove involatile contaminants and heavy metals therefrom. Treated, untreated and partially treated water can also be used in either liquid or vapor form as a washing agent for the particulate fill material or as a raw material in subsequent fabrication processes.

The aggregate material can be ground after the microwave irradiation treatment to obtain a particulate material which is then separated into coarse and fine particulate portions.

To fabricate concrete products, the coarse particulate material can be combined with predetermined amounts of water, a cement binder, a dry waste material and an aggregate material to form a concrete composition. The coarse particulate material obtained from the grinding step preferably comprises not more than about 30% by weight of the composition. The resulting composition is then placed in forms and cured in air to obtain concrete construction products.

The dry waste material is selected from the group consisting of ash, kiln dust, coke, slag, industrial waste and hazardous waste and can include one or more contaminants as defined above.

The construction products fabricated according to the methods of the invention include coarse and fine particulate fill material, concrete products, bricks, pellets, and light and heavy aggregate material. These products may contain water-insoluble compounds formed in a reaction of one or more inorganic contaminants in the composition. Some of the products can be used as raw materials in the fabrication of concrete and other construction products.

According to another aspect of the invention, an alternative method for the on-site remediation of contaminated natural resources and the fabrication of construction products therefrom comprises the steps of:

A. providing a mobile remediation and fabrication facility at the site of the contaminated natural resources;

B. obtaining a contaminated soil or sediment from the site, the soil or sediment including at least 50% water by weight and at least one of sand, soil, silt, clay and loam, and further including at least one contaminant selected from the group consisting of heavy metals, industrial waste, hazardous waste, and organic and inorganic contaminants; and C. subjecting the contaminated soil or sediment to irradiation at microwave frequencies to evaporate substantially all of the water therefrom to produce a fill material being substantially reduced in weight and volume from that of the original contaminated material.

The concentrated material can be packaged directly for transport and storage at a disposal site. Alternatively, it can be ground and separated into a coarse particulate material and a fine particulate material, which can then be used as a fill material, or further processed for use in the fabrication of construction products.

According to still another aspect of the invention, a method of on-site remediation of contaminated natural resources comprises the steps of:

A. providing a mobile facility for remediation at the site of the contaminated natural resources;

B. obtaining a contaminated solid material from the site, wherein the solid material includes water and at least one of sand, soil, silt, clay and loam, and further includes one or more contaminants selected from the group consisting of heavy metals, industrial waste, hazardous waste, organic and inorganic contaminants;

C. obtaining a contaminated liquid from the site, the liquid comprising water and one or more contaminants selected from the group consisting of heavy metals, industrial waste, hazardous waste, and organic and inorganic contaminants;

D. combining predetermined amounts of the contaminated solid material and the contaminated liquid to form a sludge, wherein one or more of the contaminants in the liquid react with one or more of the contaminants in the solid material to form water-insoluble compounds and water-soluble salts in the sludge; and E. precipitating the water-insoluble compounds from the sludge.

The sludge can be further treated to remove substantially all of the water-soluble salts therefrom.

According to yet another aspect of the invention, a method of on-site remediation of contaminated natural resources to obtain a fill material comprises the steps of:

A. providing a mobile remediation facility at the site of the contaminated natural resources;

B. obtaining a contaminated sediment from the site, the sediment including up to about 50% water and at least one of sand, soil, silt, clay and loam, and further including at least one contaminant selected from the group consisting of heavy metals, industrial waste, hazardous waste, and organic and inorganic contaminants;

C. activating the sediment in a magnetic field;

D. separating the activated sediment into a coarse fraction and a fine fraction;

E. removing a substantial portion of the water from the fine fraction; and

F. subjecting the fine fraction to irradiation at microwave frequencies to evaporate substantially all of the water therefrom and form a fill material containing water-insoluble compounds formed in a reaction of the inorganic contaminants, wherein the fill material is substantially reduced in weight and volume from that of the original contaminated sediment.

According to yet another aspect of the invention, a method of on-site remediation of contaminated natural resources and fabrication of bricks, pellets, aggregate and fill material therefrom comprises the steps of:

A. providing a mobile facility for remediation and fabrication at the site of the contaminated natural resources;

B. obtaining a contaminated material from the site, the contaminated material including up to about 50% water and at least one of sand, soil, silt, clay and loam, and further including at least one contaminant selected from the group consisting of heavy metals, industrial waste, hazardous waste, and organic and inorganic contaminants;

C. irradiating the material at microwave frequencies to evaporate a substantial portion of the water to obtain a dried material, wherein byproducts of the irradiation process include water vapor and gases containing volatilized and/or incinerated organic contaminants;

D. grinding the dried material to obtain a particulate material;

E. separating the particulate material into a coarse fraction and a fine fraction; and F. combining predetermined amounts of the coarse fraction, the fine fraction, and a dry waste material to form a construction material composition.

In one embodiment, the composition can be placed in molds and baked to obtain bricks and pellets. In an alternative embodiment, the composition can be baked, without molding, to obtain lightweight aggregate and fill material. In a preferred embodiment, the baking step is performed at a temperature of between about 1000°–1200° C. for between 1 and 6 hours.

According to still another aspect of the invention, a method for on-site remediation of contaminated natural resources comprises the steps of:

A. providing a mobile facility for remediation at the site of the contaminated natural resources;

B. obtaining a contaminated material containing up to about 50% water and at least one of sand, soil, silt, clay and loam, and further including one or more contaminants selected from the group consisting of heavy metals, industrial waste, hazardous waste, organic and inorganic contaminants; and C. irradiating the contaminated material at microwave frequencies to evaporate substantially all of the water therefrom and form a dried material having a weight and volume substantially reduced from the weight and volume of the contaminated material.

The evaporated water can be condensed and recycled to the environment or used as a raw material in subsequent fabrication processes.

These and other objects and advantages of the invention will in part be obvious and will in part appear hereinafter. The invention accordingly comprises the apparatus possessing the construction, combination of elements and arrangement of parts which are exemplified in the following detailed disclosure, the scope of which will be indicated in the claims.

BRIEF DESCRIPTION OF THE DRAWINGS

For a fuller understanding of the nature and objects of the present invention, reference should be had to the following detailed description taken in connection with the accompanying drawings, in which.

DETAILED DESCRIPTION OF THE DRAWINGS

In the flow diagrams illustrated in the FIGURES, circles denote raw materials, rectangles denote processes or operations on the raw materials, and diamonds denote final products suitable for use as construction materials or fill materials suitable for transport and/or disposal in compact form.

An important feature of the present invention is that in many instances the final products of a remediation process can be used as the raw materials in subsequent fabrication processes. Another significant feature of the present invention is the ability to fabricate a wide variety of construction materials from contaminated natural resources, regardless of the composition of the contaminated natural resources. For example, if it is desired to fabricate concrete, but sand or coarse particulate matter is not available, an "artificial" coarse or sand-like material can be fabricated from contaminated clay, sediment or soil according to the processes of the invention.

Another important feature of the invention is the immobilization or neutralization of contaminants within the fabricated products by selecting the waste streams so that their respective contaminants react with one another to form byproducts which are either removable from the resulting product, or immobilized within the resulting product, or otherwise environmentally acceptable.

Another significant feature of the invention is the ability to efficiently reduce the weight and/or volume of a contaminated sediment on-site without further remediation or treatment, in order to concentrate the contaminated material and facilitate its transportation in compact form to a disposal or storage site.

Figure 1:
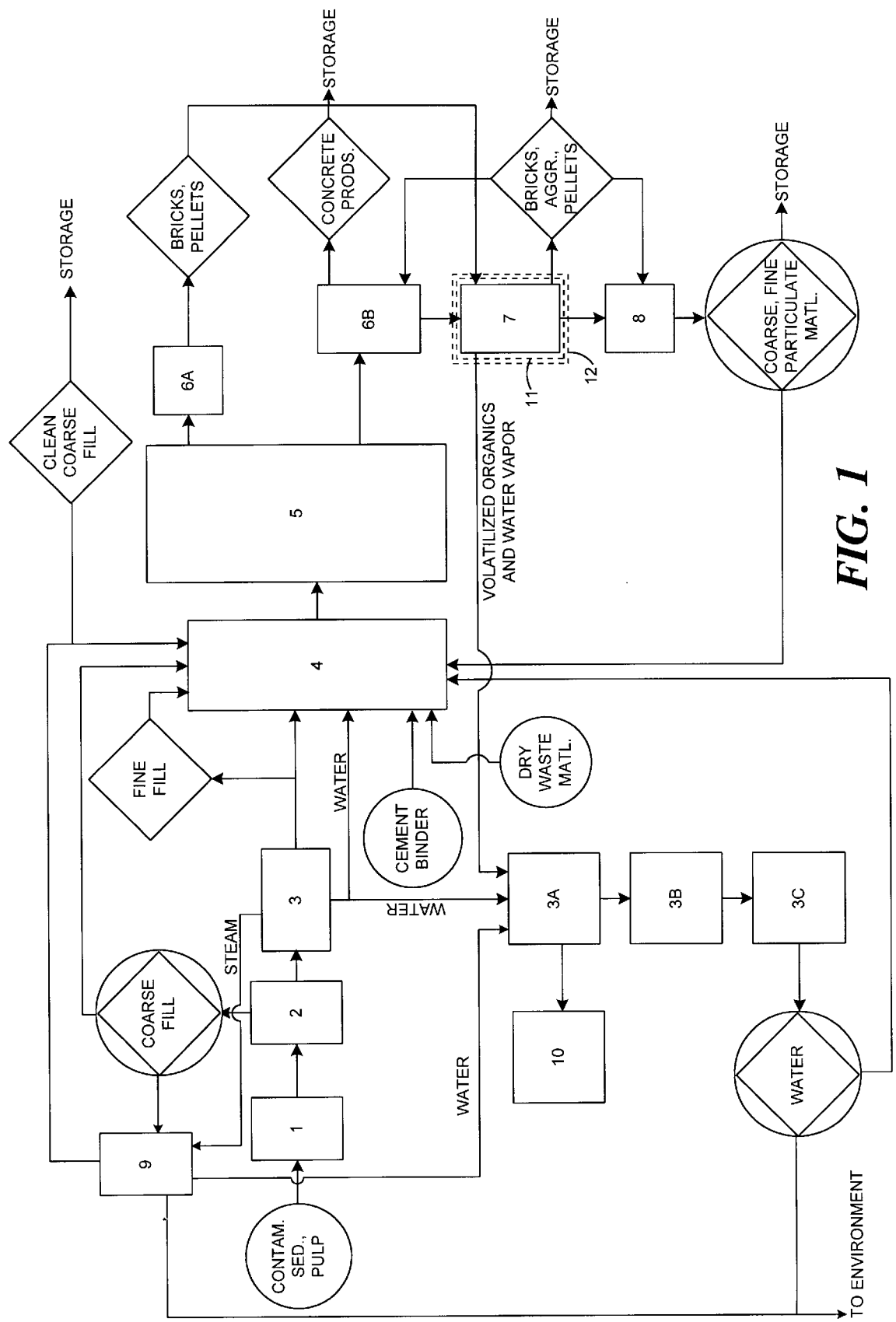
FIG. 1 is a flow diagram illustrating a method of on-site remediation of contaminated natural resources and the concurrent fabrication of a variety of construction products therefrom.

A method of remediation of contaminated natural resources and fabrication of construction products from the contaminated and/or remediated natural resources at the site of the contamination is illustrated in FIG. 1. A mobile remediation/fabrication facility is provided at the site, such as a floating barge or one or more mobile land vehicles. A contaminated material, such as a sediment containing up to about 50% water and the balance solids, including sand, silt, loam, soil and clay contaminated with one or more contaminants, or a pulp containing at least 50% water and the balance solids, is obtained from the site, such as by dredging or scooping the contaminated areas. The contaminants found in the sediment or pulp include pollutants from industrial or hazardous waste, as well as organic and inorganic contaminants.

The contaminated material is first subjected to a magnetic conditioning or activating treatment 1 in a high-intensity magnetic field in order to orient the dipoles of the water and any other polar constituents in the material to improve the separability of the constituents, enhance the treatability of the water, and increase the strength of the resulting products. The magnetic treatment of water to enhance the strength of products made with the treated water is disclosed, for example, in Russian Patent No. 34850. The intensity and polarity of the magnetic field can be controlled with automatic controls and can be varied according to a predetermined protocol.

The activated material is then processed in a separation step 2 to separate the constituents into a coarse fraction and a fine fraction. Such separation can be accomplished, for example, in a hydrocyclone, conic screen or other particle separation device. The coarse fraction obtained in process step 2 can be used as a compact coarse fill material or raw material in subsequent fabrication processes, or it can be washed in washing step 9 with clean or recycled water and used as a clean fill material or as a clean raw material in the fabrication of construction products, as discussed in greater detail below.

The fine fraction obtained in the separation step 2 is subjected to a water removal treatment operation 3 to remove a substantial portion (up to about 85%) of the water from it. The water removal operation can include, for example, centrifugation and/or mechanical pressing of the solids to obtain a dewatered cake. Optionally, the water removal operation can include the application of thermal or other energy to the fine fraction to evaporate a substantial portion of the water therefrom. Steam obtained from the water removal step can be applied to the coarse fill material in washing step 9 for further cleaning of the coarse fill material.

The water removed from the fine fraction in step 3 is further treated in process steps 3A–3C and 10, as will be detailed more fully below.

The compositions of the desired end products determine the raw materials that are to be combined, as well as their relative proportions, to form the construction products according to the present invention. In weighing step 4 each of the raw materials is combined in proportions determined according to a protocol or program which identifies a desired end product (for example, concrete, brick, aggregate, fill material), the necessary raw materials (for example, sand or coarse particulate material, cement binder, clay or fine particulate material, water, aggregate, etc.), and their correct proportions for the desired product. Predetermined proportions of various contaminated and/or clean raw materials, including, if needed, a portion of the treated effluent water obtained from the fine fraction, a cement binder, a dry waste material, and an aggregate material are combined to form a construction or fill material composition which can be subsequently treated to form the desired end products.

The dry waste material can be any solid, dry material obtained from a waste stream and may include, for example, ash, kiln dust, slag, coke, gravel, and the like. The type and extent of contamination in any of the dry waste material is not usually critical, because the contaminants can be neutralized, immobilized or minimized during subsequent remediation and fabrication processes. However, as will be discussed more fully below, the use of contaminated dry waste material in the construction material composition may be suitable only for processes which include a subsequent remediation step, such as irradiation, which immobilizes those contaminants and renders them environmentally acceptable in the final products.

For concrete products and heavy aggregate material, the coarse fraction generally comprises no more than about 30% by weight of the composition. In contrast, for brick products, lightweight aggregate and fill material, the proportion of the coarse fraction in the composition can vary widely and is not limited to 30%. The raw materials are then thoroughly mixed in a mixing step 5 and passed either to brick fabricating operation 6A or to a concrete fabricating operation 6B.

In the brick fabricating operation 6A, the construction material composition is placed in molds to form bricks or pellets of the desired size and shape. The molds are then transferred to a microwave irradiation operation 7 in an enclosed chamber 11 which is thermally insulated, yet permeable to irradiation at radio frequencies by RF-transparent heat insulation 11 and sealable from the environment by an electromagnetic radiation shield 12. By such construction, the contaminated material can be irradiated to an extremely high temperature, without damaging the irradiation equipment or the surroundings, in order to promote thermochemical reactions of the inorganic contaminants in the material.

The molds are subjected to a high-intensity electromagnetic field by irradiation at microwave frequencies in step 7 for a sufficient time to achieve a temperature suitable for the formation of water-insoluble compounds from a thermochemical reaction of the inorganic contaminants in the composition. In a preferred embodiment, the molded bricks are heated to about 1000° C. for about 6 hours, and the molded pellets and aggregate are heated to between about 1000°–1200° C. for between about 1 to 4 hours.

As an example, a contaminated soil containing one or more oxides of heavy metals, such as zinc oxide (ZnO) and lead oxide (PbO), and various silicates ($SiO_2$, $SiO_3$), is irradiated at microwave frequencies to form water-insoluble complexes of the heavy metal oxides and silicates, according to the following equations:

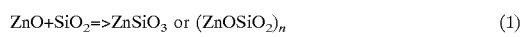
$$ZnO + SiO_2 => ZnSiO_3 \text{ or } (ZnOSiO_2)_n \quad (1)$$

$$nPbO + mSiO_2 => (PbO)_n(SiO_2)_m \quad (2)$$

This chemical reaction is advantageous because the resulting complexes, being water-insoluble, cannot readily leach out of the resulting products. The contaminants are thus immobilized within the construction products and cannot leach out into the surrounding environment.

In the concrete fabricating operation 6B, the composition (which includes the requisite proportions of water, cement binder, and aggregate material) is placed in forms of the desired shape and size and cured in air for a sufficient time (several hours to several days) to obtain concrete construction products.

The pellets which are subjected to the microwave irradiation treatment 7 become superdried and typically crumble to form a loose aggregate material. This aggregate material formed from step 7 is suitable for use as a raw material in the fabrication of concrete products, as will be detailed below, or as a fill material.

If desired, the aggregate material formed from the microwave irradiation treatment operation 7 can be subjected to a grinding treatment 8 to obtain a coarse particulate fill material and a fine particulate material. This coarse particulate material, which contains inorganic contaminants in the form of water-insoluble complexes, is suitable for use as a fill material or as a raw material in the fabrication of other construction products.

The gaseous waste products from the microwave irradiation treatment 7 can be used for mutual remediation of the contaminated effluent water, such as that obtained directly from the site or from an earlier remediation step. The application of these off-gases to the effluent water (removed from the fine fraction in step 2) in a bubbling process 3A and gas purification step 10 strips organic contaminants from the effluent water.

As an example, off-gases such as sulfur dioxide ($SO_2$) can be combined with effluent water containing one or more heavy metal salts, such as lead nitrate ($Pb(NO_3)_2$). The resulting solution yields an acid, such as nitric acid ($HNO_3$), which can be diluted and purified to acceptable levels for use in other applications, and a heavy metal sulfite, such as lead sulfite ($PbSO_3$), which is water-insoluble and can be precipitated from the solution. The equation for the reaction is:

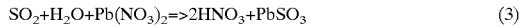

$$SO_2 + H_2O + Pb(NO_3)_2 => 2HNO_3 + PbSO_3 \qquad (3)$$

The remediation and fabrication process thus operates as a closed loop system without the addition of fresh (i.e., uncontaminated) water from outside of the site.

The effluent water can be further treated by a clarification operation 3B to remove solids, and by filtration and chemical treatments 3C to remove heavy metals and involatile contaminants. The resulting treated water is suitable for use in washing, as in coarse fill washing step 9, or as a raw material in the fabrication of construction products from the contaminated and/or remediated natural resources.

The construction products formed in the processes illustrated in FIG. 1 include, but are not limited to, clean coarse fill material, coarse and fine particulate fill material, bricks, pellets, concrete products, and light and heavy aggregate material.

Figure 2:
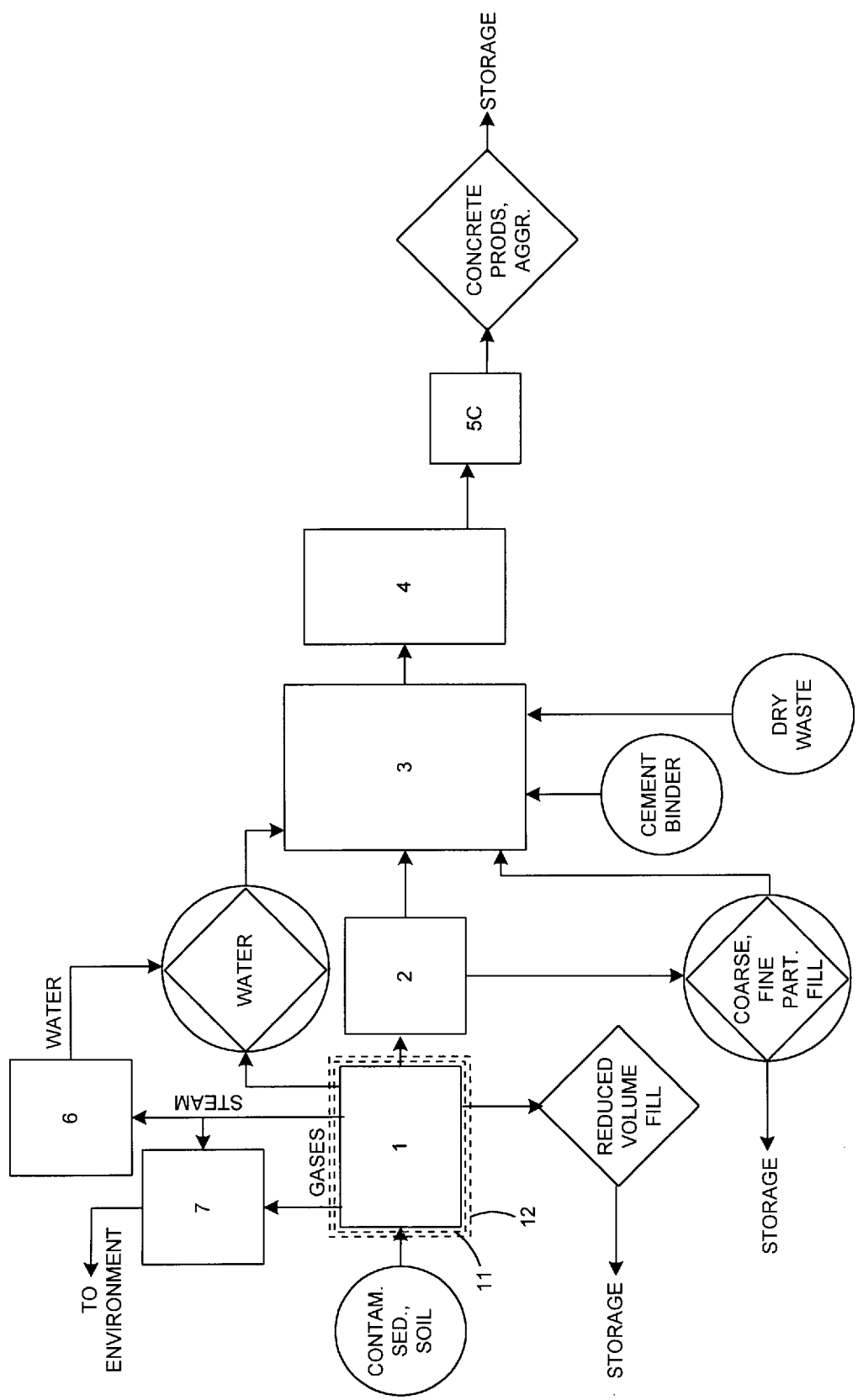
FIG. 2 is a flow diagram illustrating an alternative method of on-site remediation of contaminated natural resources and the fabrication of concrete products, aggregate and fill material therefrom.

FIG. 2 illustrates an alternative on-site remediation and fabrication process for the fabrication of concrete products and aggregate. As in the previously described method, a mobile remediation/fabrication facility, such as a floating barge or one or more mobile land vehicles, is provided at the site of contamination. A contaminated material, such as a soil or sediment containing up to about 50% water and the balance solids, including sand, silt, loam, soil and clay contaminated with one or more contaminants as described above, is obtained from the site, such as by dredging or scooping the contaminated areas. The contaminated material is subjected to a microwave irradiation treatment 1, consisting of a first relatively low-temperature drying step to evaporate substantially all of the water, and a second relatively high-temperature baking step. As previously described, the microwave irradiation operation takes place in an environmentally sealed chamber which is thermally insulated, yet transparent to RF radiation. The resulting material is a concentrated contaminated fill material which is substantially reduced in volume and weight from that of the original contaminated material. The concentrated material can be packaged for transport to a remote storage or disposal site.

The concentrated fill material can be further treated in a grinding operation 2 and then separated into coarse and fine particulate portions which include complexes of contaminants such as heavy metals which are immobilized in the matrix of the concentrated material or otherwise not readily separable therefrom. As described above in connection with the concrete fabrication process, the coarse particulate material can be combined with water, a cement binder, and one or more non-contaminated dry waste materials in predetermined proportions in weighing step 3 and mixed in step 4 to obtain a concrete construction material composition. The composition can be placed in forms of the desired shape and size in process step 5 and cured in air for up to several days to obtain concrete construction products.

The water which is evaporated from the contaminated material during microwave irradiation treatment operation 1 can be condensed in process step 6 and used, for example, as a wash solution for contaminated raw materials, or as a raw material in subsequent fabrication processes.

The off-gases from the microwave irradiation treatment 1 can be further treated in scrubbing operation 7 with water vapor from the microwave irradiation treatment step prior to release to the environment.

The construction materials and products produced by the method illustrated in FIG. 2 include, but are not limited to, concentrated fill material having a reduced weight and/or volume, coarse and fine particulate material, aggregate and concrete products.

Figure 3:
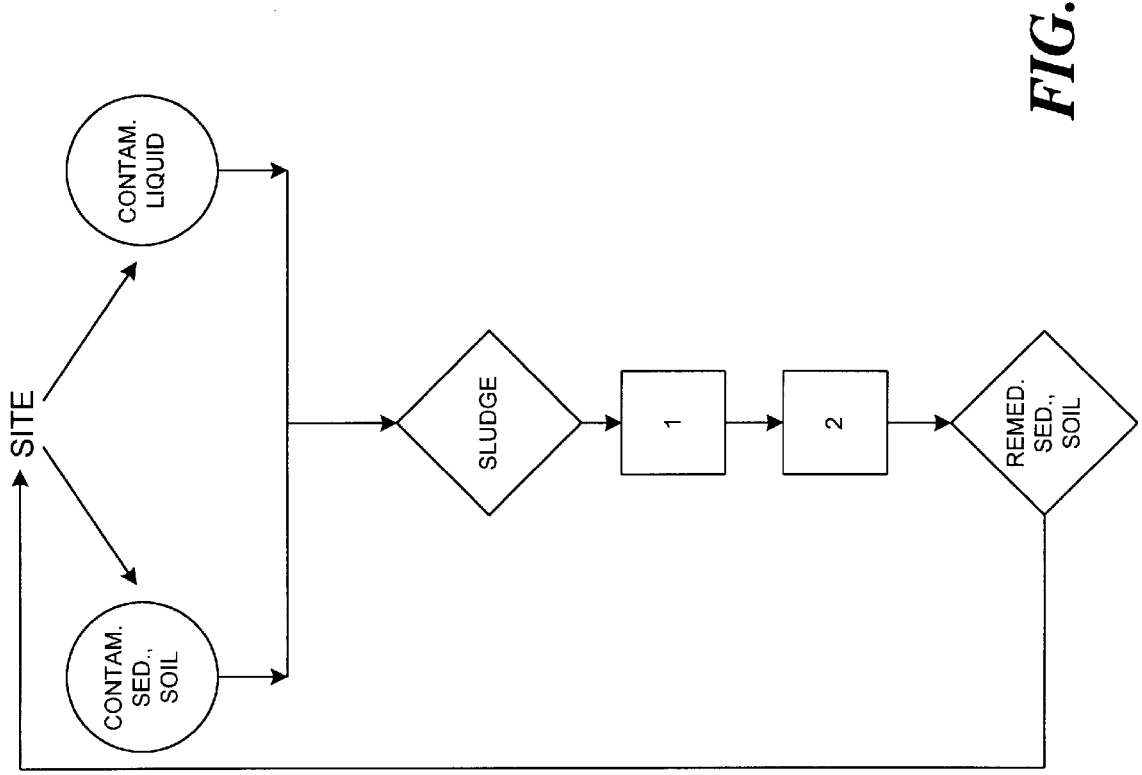
FIG. 3 is a flow diagram illustrating a method of on-site remediation of contaminated natural resources, in which various waste streams are selected to optimize their mutually contaminant-neutralizing properties.

A method of on-site remediation of contaminated natural resources is illustrated in FIG. 3. A mobile remediation/fabrication facility, such as a floating barge or one or more mobile land vehicles, is provided at the site of contamination. A contaminated sediment or soil containing up to about 50% water and the balance solids, including contaminated sand, silt, loam, soil and clay, is obtained from the site, such as by dredging or scooping the contaminated areas. A typical contaminated sediment or soil may include, for example, water-soluble lead nitrates or other water-soluble salts of heavy metals from plating processes or other industrial operations.

A contaminated liquid containing water and one or more contaminants such as, for example, heavy metals, industrial waste, hazardous waste, organic contaminants, and inorganic contaminants, is also obtained from the site using conventional methods. A typical contaminated liquid may comprise a waste stream of, for example, sodium sulfide or other water-soluble sulfides from plating processes or other industrial operations.

The contaminated sediment or soil is combined with the contaminated liquid in predetermined proportions to form a sludge, in which one or more of the contaminants in the soil or sediment react with one or more of the contaminants in the liquid to form water-insoluble complexes of the heavy metals, and water-soluble salts. As an example, the waste streams containing the contaminants described above can be combined in predetermined proportions to form relatively benign water-soluble sodium nitrate salts and water-insoluble lead sulfides, according to the following equation:

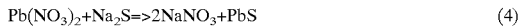

$$Pb(NO_3)_2 + Na_2S => 2NaNO_3 + PbS \qquad (4)$$

The water-insoluble compounds which contain the heavy metals can be precipitated from the sludge in a chemical treatment operation 1 according to known methods. The water-soluble salts can be removed from the sludge in a desalination process 2. The resulting remediated sediment or soil can now be returned to the site, or used as a fill material or as a raw material in other fabrication processes.

Figure 4:
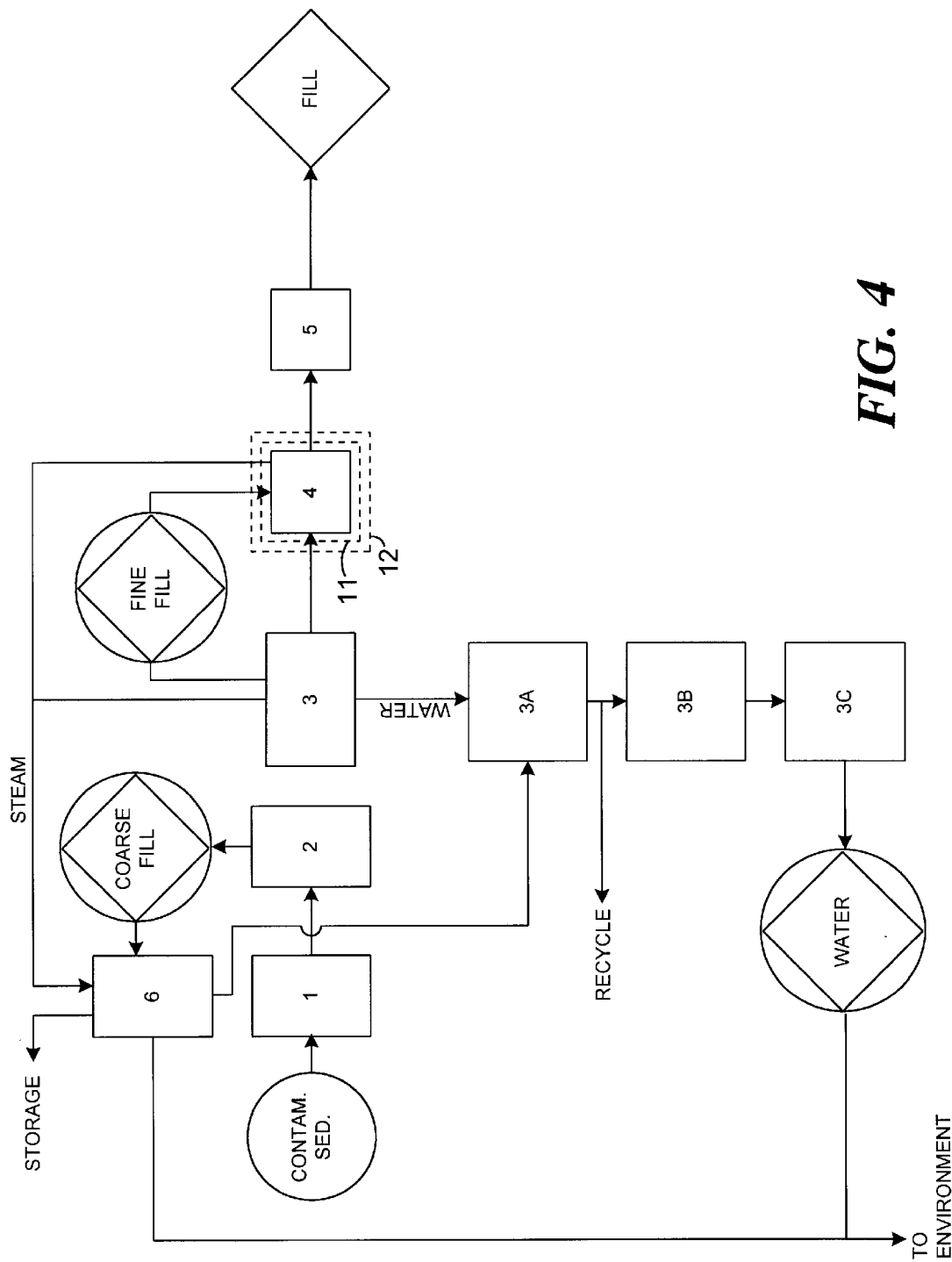
FIG. 4 is a flow diagram illustrating another method of on-site remediation of contaminated natural resources and fabrication of fill material which is reduced in weight and/or volume compared to that of the original contaminated material.

Another method of on-site remediation of contaminated natural resources is illustrated in FIG. 4. A mobile remediation facility, such as a floating barge or one or more mobile land vehicles, is provided at the site of contamination. A contaminated sediment containing at least 50% water and the balance solids, including sand, silt, loam, soil and clay contaminated with one or more contaminants as previously described, is obtained from the site, such as by dredging or scooping the contaminated areas. The sediment is first subjected to a magnetic activating treatment 1 in a magnetic field, as previously described in connection with the process illustrated in FIG. 1. The activated sediment is then processed in a separation step 2 to separate the constituents into a coarse fraction and a fine fraction. The coarse fraction can be used as a coarse fill material, or a raw material in subsequent fabrication processes, or washed with clean or recycled water in washing step 6 prior to transport to storage.

The fine fraction is subjected to a water removal operation 3 to remove a substantial portion (up to about 85%) of the water from it. The water removal operation can include, for example, centrifugation and mechanical pressing of the solids to obtain a dewatered cake. Optionally, the water removal operation can include the application of thermal or other energy to the fine fraction to evaporate a substantial portion of the water therefrom.

The dewatered cake comprises a fine fill material which is suitable for packaging and transport to a disposal site or for use as a raw material. The fine fill material is then subjected to a microwave irradiation treatment 4, as previously described in connection with the process illustrated in FIG. 1, to evaporate any residual water and volatilize and/or incinerate substantially all of the organic contaminants therein to form a baked material containing water-insoluble compounds formed in a thermochemical reaction of the inorganic contaminants therein. The baked material is then packaged in step 5 as a compact, decontaminated fill material.

As previously discussed in connection with the process illustrated in FIG. 1, the effluent water from the water removal step 3 can be further treated in operations 3A–3C to remove organic and inorganic contaminants, solids and heavy metals therefrom. Water of varying purity can be obtained from one or more of these process operations and recycled to coarse fill washing operation 6 and/or to the environment. In addition, wash water from coarse fill wash operation 6 can be further treated in water treatment processes 3A–3C prior to its release to the environment. Steam obtained from the water removal step 3 and/or the microwave irradiation step 4 can be applied to the coarse fill material in washing step 6 for further cleaning of the coarse fill material.

The construction products made according to the process illustrated in FIG. 4 include, but are not limited to, concentrated contaminated fill material, and coarse and fine decontaminated particulate fill material.

Figure 5:
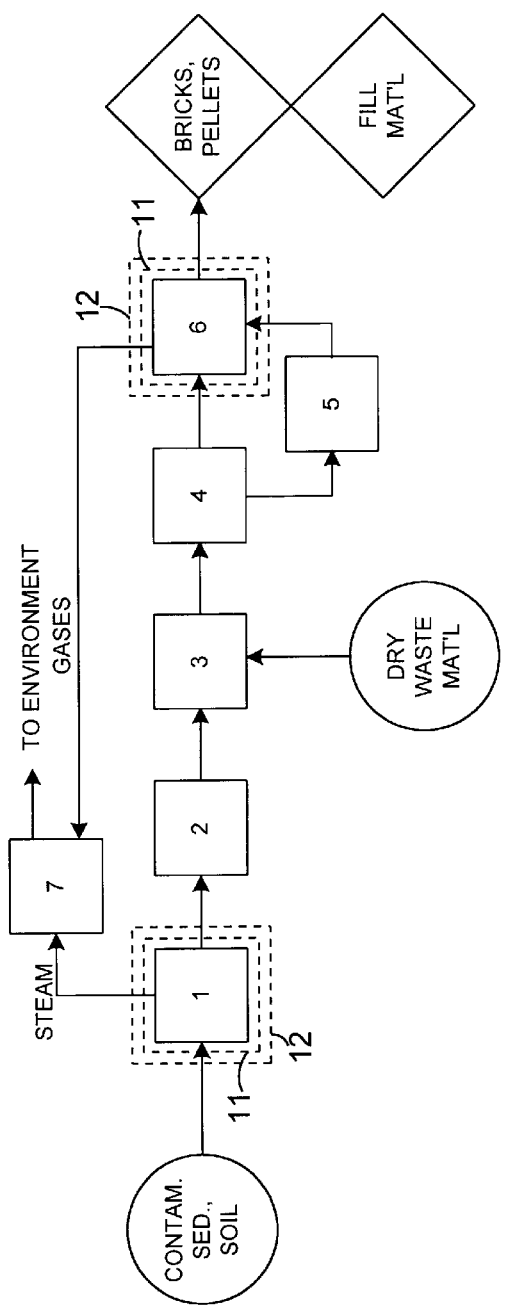
FIG. 5 is a flow diagram illustrating another method of on-site remediation of contaminated natural resources and the fabrication of molded bricks, pellets and fill material therefrom.

Another on-site remediation/fabrication process is illustrated in FIG. 5. A contaminated sediment or soil obtained from a contamination site is subjected to a relatively low-temperature microwave irradiation treatment operation 1 in a suitable enclosed chamber, as described previously in connection with earlier embodiments, to evaporate substantially all the water (between 85 and 95%) and obtain a dried material. The resulting dried material is ground in grinding operation 2 to form a coarse particulate material. This material is weighed with other dry waste material, as discussed previously, in predetermined amounts in weighing operation 3 and mixed in mixing operation 4. The resulting composition is optionally placed in molds in step 5 and subjected to a relatively high-temperature microwave irradiation in baking step 6 to form molded bricks and pellets. Alternatively, the composition can be subjected to microwave irradiation in step 6, without being first placed in molds, to form fill material. For bricks, the molds are preferably heated to a temperature of 1000° C. for about 6 hours. For pellets and lightweight aggregate, the molds are preferably heated to a temperature of 1000°–1200° C. for between 1–4 hours. For fill material, the composition is preferably heated to a temperature of 1000°–1200° C. for about 1 hour.

As in previously discussed embodiments, steam from the low-temperature microwave irradiation (drying) operation 1 can be combined with off-gases from the high-temperature microwave irradiation (baking) operation 6 in a further gas treatment operation 7 prior to release of the gases to the environment.

The construction products made according to the process illustrated in FIG. 5 include, but are not limited to, coarse and fine decontaminated fill material, and decontaminated bricks, pellets and aggregate.

Figure 6:
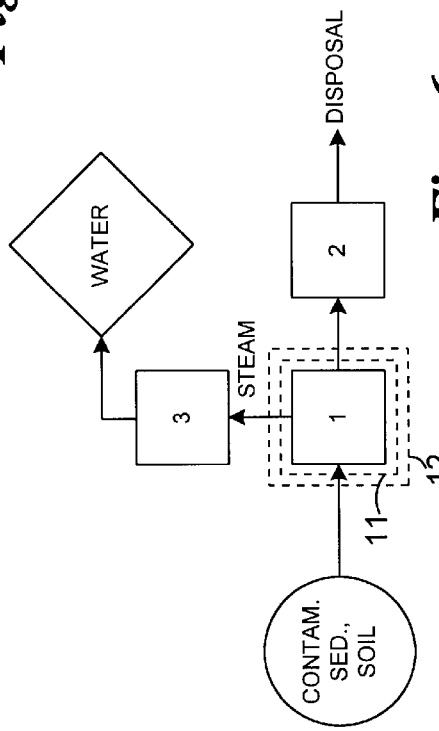
FIG. 6 is a flow diagram illustrating another method of on-site remediation of contaminated natural resources to obtain fill materials which are substantially reduced in weight and/or volume compared to that of the original contaminated material.

In yet another on-site remediation operation, illustrated in FIG. 6, a contaminated material, such as a sediment or soil containing up to about 50% water, is obtained from a contamination site and subjected to microwave irradiation treatment 1 in a suitably isolated chamber to evaporate substantially all the water in the material. The dried material, which is reduced in weight and volume substantially as compared to the weight and volume of the original contaminated material, is then packaged in step 2 in compact forms for disposal. The evaporated water from the irradiation step is condensed in condensation operation 3 and recycled to the environment or used as a wash water in other remediation processes, or as a raw material in other fabrication processes.

Because certain changes may be made in the above processes without departing from the scope of the invention herein disclosed, it is intended that all matter contained in the above description or shown in the accompanying drawings shall be interpreted in an illustrative and not a limiting sense.

I claim:

1. A method for the on-site remediation of contaminated natural resources and the fabrication of construction products therefrom, comprising the steps of:

A. providing at least one mobile facility for remediation and fabrication at the site of said contaminated natural resources;

B. obtaining a contaminated material from said site, said contaminated material comprising water and at least one of sand, soil, silt, clay and loam, and further including at least one contaminant selected from the group consisting of heavy metals, industrial waste, hazardous waste, and organic and inorganic contaminants;

C. activating said contaminated material in a magnetic field;

D. separating the activated material into a coarse fraction and a fine fraction;

E. removing a substantial portion of said water from said fine fraction; and

F. combining predetermined amounts of said coarse fraction, said fine fraction, and a dry waste material to form a construction/fill material composition.

2. The method of claim 1, wherein the water is removed from the fine fraction by at least one of centrifuging, mechanical pressing and evaporation.

3. The method of claim 1, wherein said dry waste material is selected from the group consisting of ash, kiln dust, slag, coke, industrial waste and hazardous waste.

4. The method of claim 3, wherein said dry waste material includes at least one contaminant.

5. A method for the on-site remediation of contaminated natural resources and the fabrication of construction products therefrom, comprising the steps of:

A. providing at least one mobile facility for remediation and fabrication at the site of said contaminated natural resources;

B. obtaining a contaminated material from said site, said contaminated material comprising water and at least one of sand, soil, silt, clay and loam, and further including at least one contaminant selected from the group consisting of heavy metals, industrial waste, hazardous waste, and organic and inorganic contaminants;

C. activating said contaminated material in a magnetic field;

D. separating the activated material into a coarse fraction and a fine fraction;

E. removing a substantial portion of said water from said fine fraction; and

F. combining predetermined amounts of said coarse fraction, said fine fraction, and a dry waste material to form a construction/fill material composition, comprising the further steps of:

G. placing said composition in molds to obtain bricks and pellets; and

H. subjecting said construction/fill material composition, bricks and pellets, at a minimum, to irradiation at microwave frequencies to form bricks, pellets and aggregate material containing water-insoluble compounds formed in a reaction of said inorganic contaminants in said composition, wherein byproducts of the irradiation step include water vapor and gases containing volatilized and/or incinerated organic contaminants.

6. The method of claim 5, wherein said bricks and pellets are irradiated to a first temperature of about 100°–200° C. for about 1 hour and to a second temperature of at least 1000° C. for at least 1 hour.

7. The method of claim 5, comprising the further step of treating the water removed from said fine fraction with said gases to remove volatile organic contaminants therefrom.

8. The method of claim 7, comprising the further steps of filtering, clarifying and chemically treating said water removed from the fine fraction to remove involatile contaminants and heavy metals therefrom.

9. The method of claim 5, comprising the further step of treating said byproducts from the irradiation step to remove contaminants therefrom.

10. The method of claim 5, comprising the further steps of:

I. grinding said pellets and aggregate material; and

J. separating the ground material into a coarse particulate fill material and a fine particulate material fill.

11. The method of claim 10, comprising the further steps of:

K. combining predetermined amounts of said coarse particulate material, a cement binder and water to form a concrete material composition, wherein said coarse particulate material comprises not more than about 30% by weight of said composition; and L. placing said composition in forms and curing said composition in air to obtain concrete construction products.

12. The method of claim 11, wherein said dry waste material is selected from the group consisting of ash, kiln dust, coke, slag, and industrial waste material.

13. The method of claim 1, wherein said coarse fraction comprises not more than about 30% by weight of said mixture.

14. The method of claim 13, comprising the further steps of:

G. Combining predetermined amounts of said coarse fraction, a cement binder, water, said fine fraction and a dry waste material to form a concrete material composition;

H. placing said composition in forms and curing said composition in air to obtain concrete construction products.

15. The method of claim 1, comprising the further step of washing said coarse fraction with at least one of water and steam prior to said combining step.

16. The method of claim 15, wherein said water and steam are obtained from the water removal step.

17. The method of claim 11 or 14, wherein said construction products are selected from the group consisting of coarse and fine fill material, concrete products, bricks, pellets, and aggregate material.

18. The method of claim 1, wherein said contaminated material comprises a contaminated sediment including up to about 50% water and at least 50% solids.

19. The method of claim 1, wherein said contaminated material comprises a contaminated pulp including greater than about 50% water and up to about 50% solids.

20. The method of claim 1, comprising the further step of subjecting the construction/fill material composition, at a minimum, to irradiation at microwave frequencies to form an aggregate material containing water-insoluble compounds.

21. The method of claim 20, wherein the construction/fill material composition is irradiated to a first temperature of about 100°–200° C. for about 1 hour and to a second temperature of at least 1000° C. for at least 1 hour.

* * * * *